US009954665B2

(12) United States Patent
Lindoff et al.

(10) Patent No.: US 9,954,665 B2
(45) Date of Patent: Apr. 24, 2018

(54) SERVER, WIRELESS DEVICE, METHODS AND COMPUTER PROGRAMS FOR DISTRIBUTING PERFORMANCE OF A CONTROL TASK BASED ON A CONNECTION QUALITY

(71) Applicant: Telefonaktiebolaget L M Ericsson (publ), Stockholm (SE)

(72) Inventors: Bengt Lindoff, Bjärred (SE); Johan Eker, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 298 days.

(21) Appl. No.: 14/892,244

(22) PCT Filed: Nov. 12, 2015

(86) PCT No.: PCT/EP2015/076444
§ 371 (c)(1),
(2) Date: Nov. 19, 2015

(87) PCT Pub. No.: WO2017/080604
PCT Pub. Date: May 18, 2017

(65) Prior Publication Data
US 2017/0195104 A1    Jul. 6, 2017

(51) Int. Cl.
*H04L 5/00* (2006.01)
*H04W 28/16* (2009.01)
(Continued)

(52) U.S. Cl.
CPC ......... *H04L 5/0057* (2013.01); *H04B 17/101* (2015.01); *H04B 17/24* (2015.01);
(Continued)

(58) Field of Classification Search
None
See application file for complete search history.

(56) References Cited

U.S. PATENT DOCUMENTS

| 5,956,683 A * | 9/1999 | Jacobs | G10L 15/02 704/201 |
| 2005/0165886 A1* | 7/2005 | Tuer | B60K 31/0058 709/203 |

(Continued)

FOREIGN PATENT DOCUMENTS

| EP | 2088807 A2 | 8/2009 |
| WO | 2012145792 A1 | 11/2012 |
| WO | 2015133943 A1 | 9/2015 |

*Primary Examiner* — Hassan Kizou
*Assistant Examiner* — Ashil Farahmand
(74) *Attorney, Agent, or Firm* — Coats & Bennett, PLLC

(57) ABSTRACT

A server is connected via a wireless communication network to be capable of receiving sensor information from a wireless device and provide control signals based on at least the sensor information to the wireless device for enabling the wireless device to perform a control task. The server is arranged to receive an estimate of imminent connection state of the wireless device and adapt operation such that upon the estimated imminent connection state indicates a connection quality parameter to have a quality below a first threshold, the server provides an information package to be sent to the wireless device for enabling the wireless device to perform at least an increased part of the operation task locally at the wireless communication device, and upon the estimated imminent connection state indicates the connection quality parameter to have a quality above a second threshold, the server provides an information package to be sent to the wireless device for enabling the wireless device to be relieved from performing at least a part of the operation task by the server providing increased aid in performing the control task. The wireless device, methods and computer programs are also disclosed.

43 Claims, 6 Drawing Sheets

(51) Int. Cl.
*H04L 1/00* (2006.01)
*H04W 24/08* (2009.01)
*H04B 17/24* (2015.01)
*H04B 17/10* (2015.01)
*H04B 17/309* (2015.01)

(52) U.S. Cl.
CPC ......... *H04B 17/309* (2015.01); *H04L 1/0026* (2013.01); *H04W 24/08* (2013.01); *H04W 28/16* (2013.01)

(56) References Cited

U.S. PATENT DOCUMENTS

2009/0203388 A1* 8/2009 Karaoguz ............... H04W 4/02
455/456.3
2010/0153007 A1 6/2010 Crowley
2015/0120296 A1* 4/2015 Stern ....................... G10L 15/30
704/236

* cited by examiner

SERVER, WIRELESS DEVICE, METHODS AND COMPUTER PROGRAMS FOR DISTRIBUTING PERFORMANCE OF A CONTROL TASK BASED ON A CONNECTION QUALITY

TECHNICAL FIELD

The present invention generally relates to a server connected via a wireless communication network to be capable of receiving sensor information from a wireless device and provide control signals based on at least the sensor information to the wireless device for enabling the wireless device to perform a control task, to such a wireless device, methods for the server and wireless device, and computer programs for implementing the methods.

BACKGROUND

Applications consisting of sensors and devices that collaborate wirelessly and share state in the cloud are expected to become commonplace in the networked society. Information may be gathered in a distributed fashion using large set of sensors, which communicate readings to a central unit, possibly a server running in the cloud, which then acts upon filtered data and coordinates and/or controls actuators. Cloud applications are commonly designed in a client server fashion, where the client part resides in a wireless device and a server part runs in the cloud. A condition for this to work is that the connection between the two components remains intact.

An example of such application is a traffic control system for autonomous vehicles on ground, in the air or in the water. Cameras and other sensors attached to autonomous vehicles can for example report back readings of positions of other vehicles to form a continuously updated database used for traffic control. The sensor data may be processed and combined internally, i.e. locally at the wireless device, and with external data, i.e. provided from the server, to form a fuller picture. For example, camera data from wireless devices can be combined with static map information to create a richer and up-to-date live map, for example as shown in FIG. 6, which illustrates a traffic control system for autonomous vehicles.

Applications consisting of sensors and devices that collaborate wirelessly and share state in the cloud are expected to become commonplace in the networked society. Information is gathered in a distributed fashion using large set of sensors, which communicates readings to a central unit, possibly a server running in the cloud, which then acts upon the filtered data and coordinates and/or control actuators. Cloud applications are commonly designed in a client server fashion, where the client part resides in the wireless device and the server part runs in the cloud. A condition for this to work is that the connection between the two components remains intact.

An example of such application is a traffic control system for autonomous vehicles, (on ground, in the air or in the water. Cameras and other sensors attached to autonomous vehicles can for example report back readings of positions of other vehicles to form a continuously updated database used for traffic control. The sensor data may be processed and combined internally and with external data to form a fuller picture. For example, camera data from mobile devices can be combined with static map information to create a richer and up-to-date live map, as shown in FIG. 6.

The application in FIG. 6 can be considered as a driver to motivate and describe a problem at hand and to which a solution is desired to be provided. Other scenarios where entities are to be controlled may provide a similar problem. Therefore there is a need for method and apparatus solving the problem caused by varying radio link performance.

SUMMARY

The invention is based on the understanding that connectivity level may vary over time for a mobile device, and that a controller operation setup between a local controller and a cloud based controller may be split taking the connectivity into account.

According to a first aspect, there is provided a server connected via a wireless communication network to be capable of receiving sensor information from a wireless device and provide control signals based on at least the sensor information to the wireless device for enabling the wireless device to perform a control task. The server is arranged to receive an estimate of imminent connection state of the wireless device and adapt operation such that upon the estimated imminent connection state indicates a connection quality parameter to have a quality below a first threshold, the server provides an information package to be sent to the wireless device for enabling the wireless device to perform at least an increased part of the operation task locally at the wireless communication device, and upon the estimated imminent connection state indicates the connection quality parameter to have a quality above a second threshold, the server provides an information package to be sent to the wireless device for enabling the wireless device to be relieved from performing at least a part of the operation task by the server providing increased aid in performing the control task.

The estimated imminent connection state may be based on at least one or more radio channel parameters at the wireless device. The radio channel parameters may comprise one or more of signal-to-interference-and-noise ratio, signal strength, uplink throughput, downlink throughput, latency, used radio access technology, and one or more of the above for a neighbouring cell.

The estimated imminent connection state may be based on at least one or more spatial parameters of the communication device. The spatial parameters may comprise one or more of a position of the wireless device, heading of the wireless device, and a speed of the wireless device.

The information package provided from the server for enabling the wireless device to perform at least an increased part of the operation task locally may comprise one or more of a set of computer executable instructions, a control parameter set, and a control model.

The wireless network may be a cellular network and the imminent connection state may include information whether a handover operation is imminent.

The control signals may further be based on at least sensor information from at least a further device being in connection with the server.

The control task may comprise controlling a vehicle. The information package may comprise information about other vehicles.

According to a second aspect, there is provided a method of a server connected via a wireless communication network to a wireless device. The method comprises receiving sensor information from the wireless device, providing control signals based on at least the sensor information to the wireless device for enabling the wireless device to perform a control task, receiving an estimate of imminent connection state of the wireless device, and adapting operation such that upon the estimated imminent connection state indicates a connection quality parameter to have a quality below a first threshold, providing an information package to be sent to the wireless device for enabling the wireless device to perform at least an increased part of the operation task locally at the wireless communication device, and upon the estimated imminent connection state indicates the connection quality parameter to have a quality above a second threshold, providing an information package to be sent to the wireless device for enabling the wireless device to be relieved from performing at least a part of the operation task by the server providing increased aid in performing the control task.

The estimated imminent connection state may be based on at least one or more radio channel parameters at the wireless device. The radio channel parameters may comprise one or more of signal-to-interference-and-noise ratio, signal strength, uplink throughput, downlink throughput, latency, used radio access technology, and one or more of the above for a neighbouring cell.

The estimated imminent connection state may be based on at least one or more spatial parameters of the communication device. The spatial parameters may comprise one or more of a position of the wireless device, heading of the wireless device, and a speed of the wireless device.

The information package provided from the server for enabling the wireless device to perform at least an increased part of the operation task locally may comprise one or more of a set of computer executable instructions, a control parameter set, and a control model.

The wireless network may be a cellular network, and the imminent connection state may include information whether a handover operation is imminent.

The control signals may further be based on at least sensor information from at least a further device being in connection with the server.

The control task may comprise controlling a vehicle.

According to a third aspect, there is provided a computer program comprising instructions which, when executed on a processor of a server, causes the server to perform the method according to the second aspect.

According to a fourth aspect, there is provided a wireless device comprising a controller, wherein the controller is connected to at least one sensor arranged for collecting sensor information and the controller is arranged for performing a control task with aid from a server connected to the wireless device via a wireless communication network, wherein the wireless device is arranged to provide the sensor information to the server and is arranged to receive control signals from the server, which control signals are utilized for the control task as the aid for performing the control task, and the wireless device is further arranged to estimate an imminent connection state to the wireless communication network and report the estimated imminent connection state to the server such that upon the estimated imminent connection state indicates a connection quality parameter to have a quality below a first threshold, an information package is received from the server for enabling the wireless device to perform at least an increased part of the operation task locally, and upon the estimated imminent connection state indicates the connection quality parameter to have a quality above a second threshold, an information package is received for enabling the wireless device to be relieved from performing at least a part of the operation task by the server providing increased aid in performing the control task.

The estimate of imminent connection state may be based on a measurement of one or more radio channel parameters. The radio channel parameters may comprise one or more of signal-to-interference-and-noise ratio, signal strength, uplink throughput, downlink throughput, latency, used radio access technology, and one or more of the above for a neighbouring cell.

The imminent connection state may be based on at least one or more spatial parameters of the wireless device. The spatial parameters comprise one or more of a position of the wireless device, heading of the wireless device, and a speed of the wireless device.

The information package received from the server for enabling the wireless device to perform at least an increased part of the operation task locally may comprise one or more of a set of computer executable instructions, a control parameter set, and a control model.

The wireless network may be a cellular network and the imminent connection state may include information whether a handover operation is imminent.

Upon the estimated imminent connection state indicates a connection quality parameter to have a quality below a third threshold, an additional sensor may be activated for enabling the wireless device to perform further control locally.

The control task may comprises controlling a vehicle. The increased aid in performing the control task provided from the server may comprise information about other vehicles.

According to a fifth aspect, there is provided a method of a wireless device comprising a controller. The controller is connected to at least one sensor arranged for collecting sensor information and the controller is arranged for performing a control task with aid from a server connected to the wireless device via a wireless communication network. The method comprises providing the sensor information to the server, receiving control signals from the server, which control signals are utilized for the control task as the aid for performing the control task, estimating an imminent connection state to the wireless communication network, reporting the estimated imminent connection state to the server such that upon the estimated imminent connection state indicates a connection quality parameter to have a quality below a first threshold, an information package is received from the server for enabling the wireless device to perform at least an increased part of the operation task locally, and upon the estimated imminent connection state indicates the connection quality parameter to have a quality above a second threshold, an information package is received for enabling the wireless device to be relieved from performing at least a part of the operation task by the server providing increased aid in performing the control task. The method further comprises controlling one or more physical entities according to the control task.

The estimating of imminent connection state may comprises measuring one or more radio channel parameters, and forming an estimate of the imminent connection state based on at least the one or more radio channel parameters. The radio channel parameters may comprise one or more of signal-to-interference-and-noise ratio, signal strength, uplink throughput, downlink throughput, latency, used radio access technology, and one or more of the above for a neighbouring cell.

The estimating of imminent connection state may comprise determining one or more spatial parameters of the wireless device, and forming an estimate of the imminent connection state based on at least the one or more spatial parameters. The determining of spatial parameters may comprise one or more of determining a position of the wireless device, determine a heading of the wireless device, and determining a speed of the wireless device.

The information package received from the server for enabling the wireless device to perform at least an increased part of the operation task locally may comprise one or more of a set of computer executable instructions, a control parameter set, and a control model.

The wireless network may be a cellular network and the imminent connection state may include information whether a handover operation is imminent.

Upon the estimated imminent connection state indicates a connection quality parameter to have a quality below a third threshold, the method may include activating an additional sensor for enabling the wireless device to perform further control locally.

The control task may comprise controlling a vehicle. The information package received for enabling the wireless device to be relieved may comprise information about other vehicles.

According to a sixth aspect, there is provided a computer program comprising instructions which, when executed on a processor of a wireless device, causes the wireless device to perform the method according to the fifth aspect.

In this context, the "threshold" may be defined by a predetermined value, a value formed by one or more functions depending on operation, or a trend of values, wherein the value or trend of values may be compared or correlated with values representing estimated imminent connection state for finding out whether the forecasted connection quality is below or above the threshold.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION

Figure 6:
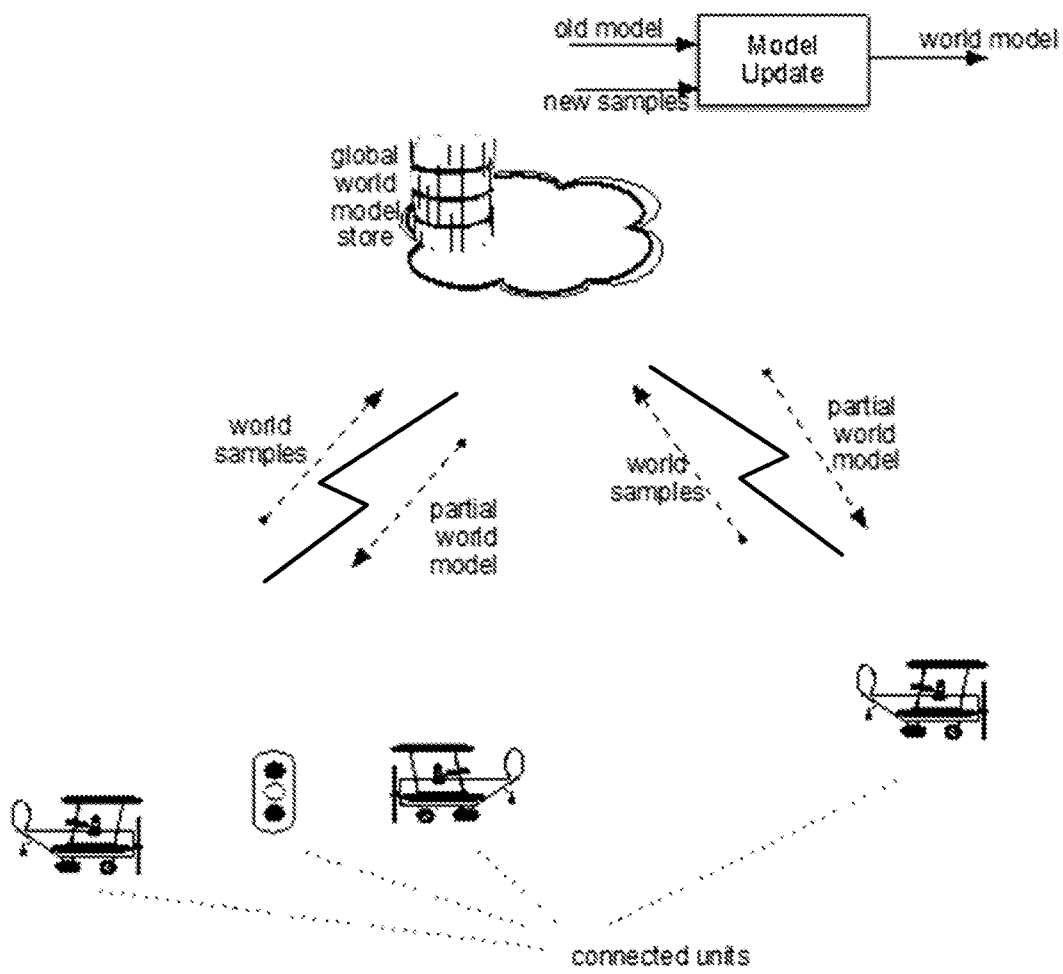
FIG. 6 schematically illustrates an exemplary scenario.

Returning to FIG. 6, a set of unmanned vehicles operates in an environment that is only partially known and constantly changing, i.e. like the real world. The vehicles share a common dataset, which is stored on some sort of cloud service and in this case holds information about the environment, such as viable paths, obstacles, weather conditions, etc. and the location, speed, direction, etc. of connected vehicles. The vehicles move around and the quality of the wireless connection is assumed to vary over time. The vehicles must therefore be able to operate under a set of different conditions. The vehicles are equipped with sensors and regularly report back information to the cloud and retrieve an updated world model in return.

When fully connected they basically have unlimited access to information about the environment, and during periods of limited access they are expected to operate more autonomously. The core of the proposed innovation deals with interaction between the application and the underlying radio technology, where the latter informs the former of predicted future connectivity and thereby allows for pre-loading of information that may be needed during periods of reduced connectivity.

The problem that connectivity will vary as a function of time and hence the link performance (latency, throughput, etc.) may vary implies that the client application may not be able to receive all data needed from the remote server all the time. Hence, the performance of the application may vary reducing the Quality of Service, QoS, i.e. the service of providing proper control data, e.g. data for direct control of the controlled entity or data used to provide control of the controlled entity, which control data is intended to be provided to the wireless device as control signals for enabling the wireless device to easier and/or more accurately provide proper control.

To address the problem of loss of functionality due to low (or even no) bandwidth the application is designed to operate in at least two modes. In a Full Connected State the application consists of two parts: one in the cloud doing a (major) part of the data processing, and one in the device doing a (minor) part of the processing. In a second application mode, called Less Connected State, the wireless device may have lower connectivity performance to the cloud side and hence may rely on a majority of the processing in the device, since full information cannot be sent over the radio interface, in uplink and/or downlink, due to the low radio link performance. To improve performance, the device side may preload the parts of the application that it may need during the time where the link is worse. An estimate of imminent connection state is thus performed, i.e. what connectivity quality that is expected within close future. Once the application enters into a third state Preparation State when it is notified by the underlying communication system that low connectivity is expected shortly, parts of the application is forwarded from the server in the cloud to the device, and hence a majority of the application processing may be made in the device during the low connectivity time period. The preparation state may be detected based on radio parameters, like signal-to-interference-and-noise ratio, SINR, reference signal received power, RSRP, serving cell and neighbouring cell information, measurement order information from the serving cell, radio access technology, RAT, used etc.

This allows mobile-cloud applications to improve performance during periods of low connectivity. For example, autonomous vehicles may preload the latest version of a world model that may include a 3D map and current locations of the other vehicles and instead use internal models to predict the future states of obstacles and other vehicles. This may also include turning on additional sensors that are normally turned off while connected to the cloud in order to save energy. Further adaptations may be made, as will be discussed in light of some examples below.

Figure 1:
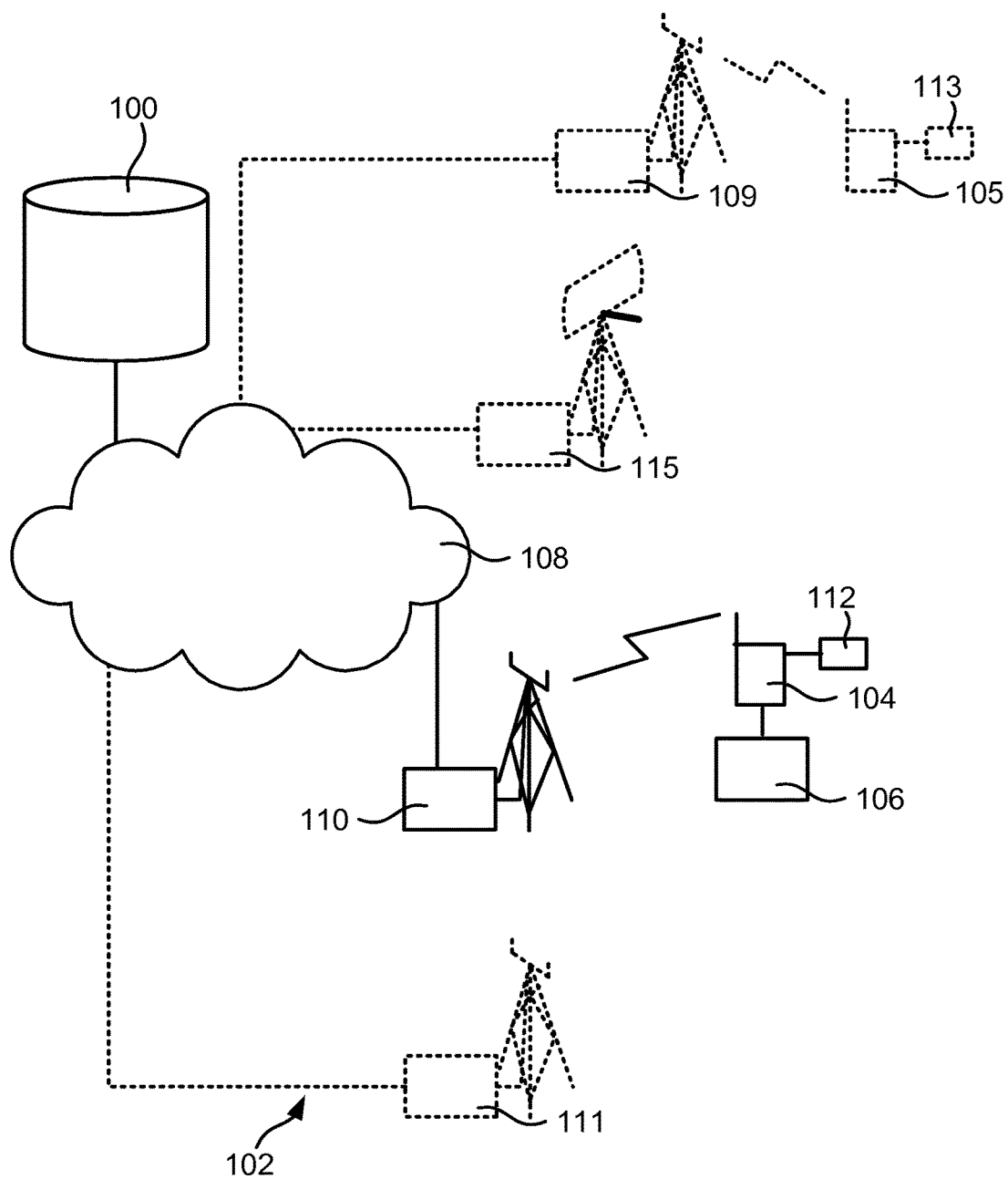
FIG. 1 schematically illustrates a server connected to a communication system which is in wireless communication with a wireless device controlling a controlled entity.

FIG. 1 schematically illustrates a server 100 connected to a communication system 102 which is in wireless communication with a wireless device 104 controlling a controlled entity 106. The connection between the server 100 and the communication system 102 may be direct or via one or more networks 108. The communication system 102 may comprise a cellular wireless communication system comprising a plurality of network nodes 109, 110, 111, e.g. base stations, access points, etc. In the illustration of FIG. 1, the network node 110 is serving the wireless device 104 and providing the wireless part of the connection between the server 100 and the wireless device 104. The wireless device 104 is connected to the controlled entity 106 such that control can be provided. Furthermore, one or more sensors 112 are connected to the wireless device 104. At least some of the sensors 112 may be located at or in the controlled entity 106.

The wireless device 104 provides, via an uplink communication channel to the serving network node 110, sensor signals, i.e. signals obtained or derived from the one or more sensors 112, to the server 100 via the one or more networks 108. The server 100 provides control signals, i.e. signals intended for control, directly or indirectly, of the controlled entity via the one or more networks 108 and the serving network node 110 to the wireless device 104 which performs the control task using the control signals. Here, the control can comprise closed loop control or open loop control. The sensor signals may be stored, aggregated or processed in other ways in the server 100 to provide the control signals. In the wireless device 104, the control signals may be used for changing control schemes and/or models, setting control parameters, be processed for forming actual control signals for the controlled entity 106, and/or be used directly for controlling the controlled entity 106.

The server 100 may also collect data from other devices, which data may be included in the forming of the control signals. For example, another wireless device 105 may be connected to one or more sensors 113 and provide the sensor signals in a similar way to the server 100, i.e. via a serving network node 109 and the one or more networks 108, wherein the collected data from the one or more servers 113 may play a role in forming the control signals. An example is that the server 100 additionally or alternatively gains data from a sensor 115 connected directly via the one or more networks 108 to the server 100. In FIG. 1, this sensor 115 is represented by is a radar station, but the sensor 115 may be of any kind that could provide data usable for forming the control signals.

The estimation of imminent connectivity may be made based on different and/or aggregated collected data. For example, consider that the wireless device 104 is about to make handover from network node 110 to network node 111. This is inherently known at least slightly before performing the handover. Thus, any limitations in connectivity due to handover may be estimated in advance, and the control operations may be adapted accordingly. Other examples are observations of trends of radio parameters, e.g. signal strength, interference, etc., such that a forecast for the close future may be performed. Here, parameters such as latency, throughput, error rates, etc. of the wireless communication may affect the way of performing control assisted from the server 100. Adaptation of the control operations can thus be made accordingly.

Estimated worsened connectivity, for example when it is expected to be worse than a threshold where the threshold is depending on the demands of how the control operations are made via the wireless connection, may call for decreasing at least some parts of the control assistance from the server 100 and increasing local control and/or autonomy at the wireless device 104. Estimated improved connectivity may on the other hand give the opportunity to adapt control operations to improve control and/or relieve the wireless device 104 from some processing etc. This may for example be made when estimated imminent connectivity is better than a threshold, where this threshold depends on demands on connectivity for the adapted control operations.

The server 100 is thus arranged to receive an estimate of imminent connection state of the wireless device 104. The estimate may be received from the communication network, e.g. from the serving network node 110, or from the wireless device 104. The server 100 may then adapt operation, which upon the estimated imminent connection state indicates a connection quality parameter to have a quality below a first threshold includes that the server 100 provides an information package to be sent to the wireless device 104 for enabling the wireless device 104 to perform at least an increased part of the operation task locally at the wireless communication device 104. Upon the estimated imminent connection state indicates the connection quality parameter to have a quality above a second threshold, the server 100 provides an information package to be sent to the wireless device 104 for enabling the wireless device 104 to be relieved from performing at least a part of the operation task by the server 100 providing increased aid in performing the control task.

In this context, the "threshold" may be defined by a predetermined value, a value formed by one or more functions depending on operation, or a trend of values, wherein the value or trend of values may be compared or correlated with values representing estimated imminent connection state for finding out whether the forecasted connection quality is below or above the threshold.

The estimated imminent connection state may be based on at least one or more radio channel parameters, uplink and/or downlink, at the wireless device, such as SINR, signal strength, throughput, latency, etc. A parameter that may be considered may also be what radio access technology, RAT, that is about to be used. The corresponding features for a neighbouring cell may also be taken into consideration. This may be important if a handover is imminent, but also for taking possible interference into account. Taking the example of FIG. 6 into account, where the server keeps track of the devices and events in the environment of the wireless device, the estimate of the imminent connection state may be improved by taking spatial parameters of the communication device into account, e.g. a position, speed, heading, etc. of the wireless device.

When the estimate indicates worsened future connectivity, the server prepares for that situation when the estimated connectivity falls below what is demanded from current control operation setup. The server 100 then prepares for the situation by providing an information package, preferably before the worsened connectivity is effected, for enabling the wireless device to perform at least an increased part of the operation task locally. The information package may for example comprise a set of computer executable instructions, e.g. a control application or program suited for the upcoming situation. The information package may additionally or alternatively comprise a control parameter set and/or a control model to be used during the upcoming situation. As also briefly indicated with reference to the example of FIG. 6, i.e. applied on vehicle/traffic control, the information package may comprise a fresh view on vehicles in the system and possibly an estimate or model of the view in close future, which may be formed based on gathered information about positions, speeds and headings of the vehicles of the system.

In the disclosure above, the server 100 has been illustrated as a single physical entity. However, the server 100 may be implemented according to the concept normally referred to as "the cloud", i.e. where the functionality may be migrated between different servers located at different geographical and/or administrative locations, e.g. to limit latency due to long signal lines, to distribute processing and/or storing capacity, etc.

Figure 2:
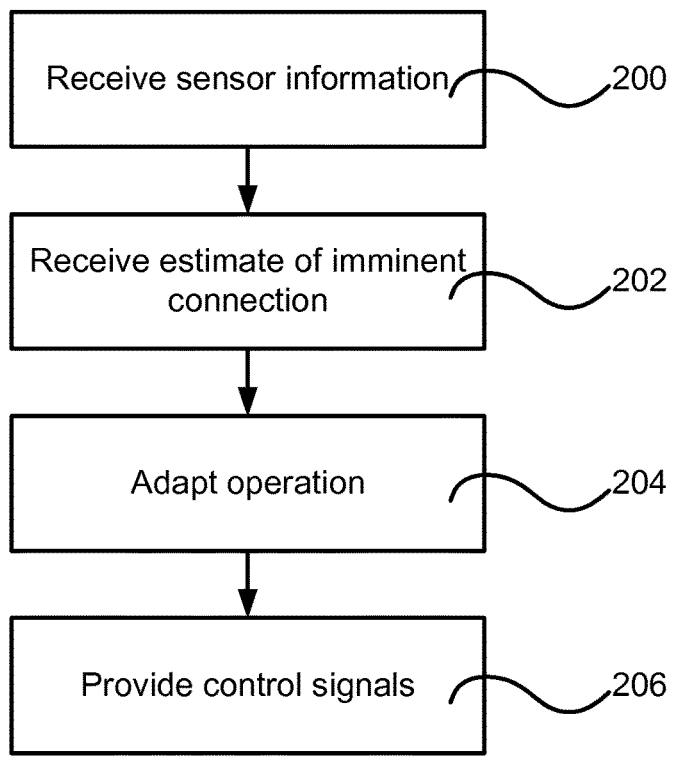
FIG. 2 is a flow chart illustrating a method for a server according to an embodiment.

FIG. 2 is a flow chart illustrating a method for a server according to an embodiment. The server receives 200 sensor information from one or more sensors. The sensor information may be from the wireless device, but may also be from other sensors, e.g. other wireless devices and/or other sensors connected to the server via one or more communication networks. The sensor information is preferably received 200 whenever available, and should not be construed as a sequential process step. The server also receives 202 an estimate of imminent connection state, which for example may be according to a predefined mapping or may be information from which the estimate may be made by the server. The server then adapts 204 the control operation based on the estimate. Here, the adaption 204 may also be that no change to previous control setup is made if the estimate is such that the current control setup is the most promising. Otherwise, the adaption 204 includes, as demonstrated above, to push more of the control operations to the wireless device or to relieve more of the control operation from the wireless device. Control signals are provided 206 according to the determined control setup. Here, control signals for ongoing control tasks are provided 204 whenever available, and this part should not be construed as a sequential process step. The control signals may also include additional information related to the adaptation 204, which thus is to be considered as a sequential step of the adaption 204, which in turn is a sequential step of reception 202 of the estimate. For the latter part of provision 206 of control signals, the provided information may comprise the information needed for the wireless device to adapt the control setup, as discussed above. Also here it can be noted that the estimate-adapt-provide control setup information sequence 202, 204, 206 is also made whenever an estimate of imminent connection is available. Thus, the method may be considered as two real-time objects where one takes care of collecting sensor data and provide control signalling based thereon, and another takes care of estimating connectivity and adapting control setup based thereon.

Figure 3:
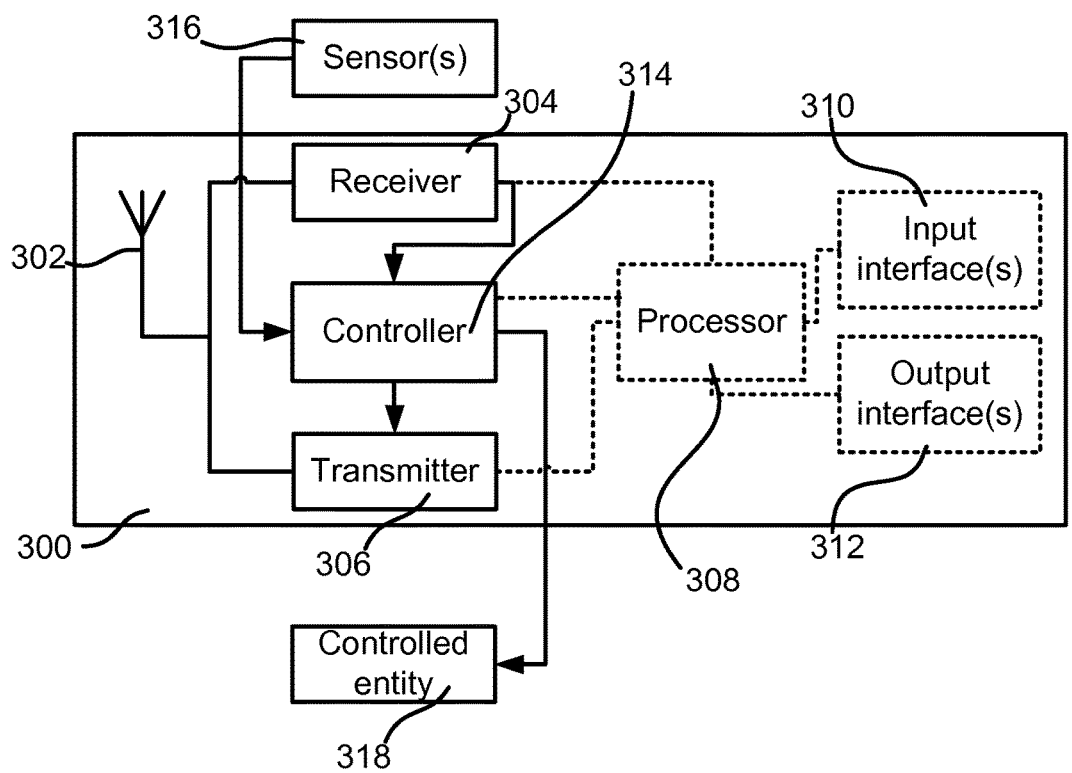
FIG. 3 is a block diagram illustrating a wireless communication device to which one or more sensors are connected, and which is controlling a controlled entity.

FIG. 3 is a block diagram illustrating a wireless communication device 300 to which one or more sensors 316 are connected, and which is controlling a controlled entity 318. In the disclosure above, the term "wireless device" has been used, which should be construed as the wireless communication device 300 with any interfaces towards the sensors 316 and towards the controlled entity 318. The wireless communication device 300 comprises and antenna arrangement 302, which may comprise one or more antennas or antenna ports. The antenna arrangement 302 is connected to a receiver 304 and to a transmitter 306 for enabling transceiver operations. The receiver 304 and transmitter 306 may be connected to a processor 308 of the wireless communication device 300 which may take care of a variety of tasks, such as signal processing, communication control, etc. The processor 308 may comprise one or more processing means, e.g. dedicated processing means for different tasks. The processor 308 may be connected to input interface(s) 310 and output interface(s) 312 for enabling the wireless communication device to interact with its surrounding environment, e.g. human-machine interaction, signal interaction, etc. The wireless communication device further comprises a controller 314 arranged to control the controlled entity 318. Here, the controller 314 may physically, at least partly, be part of the processor 308 and the output interface 312, but for the sake of easier understanding, the controller 314 is illustrated as a separate item for better describing the particular features of performing the control task. The controller 314 may also be a separate unit. The controller 314 is arranged to receive, via the receiver 304, control signals provided from the server. The control signals from the server may be used directly for control, or may be used by the controller 314 to form control signals provided to the controlled entity 318. For example, the control signals provided from the server may contain information about an updated control model, updated control parameters, an updated model of surroundings, and/or a new set of waypoints, etc. From these, the local controller 314 may form the actual control signals provided to the controlled entity 318. For control signals used directly to control the controlled entity 318, a few notes may be made. One aspect is that such directly used control signals may be time critical. In such case, the communication parameters latency and robustness may be particularly important for selecting the control setup. If those controls signals risk being too late or be uncertain to arrive due to the wireless link, it is wise to push that part of the control to be performed locally by the controller 314. Other examples may be a large number of control signals which demand large bandwidth, and when that large bandwidth is not available, the similar pushing of control tasks to be performed locally may be made.

The controller 314 may be connected to the transmitter 306 to provide information that is to be provided to the server. Here, the collection of sensor signals may also be made by the controller 314 and be forwarded to the server via the transmitter 306. The controller 314 may also be connected to interact with the processor 308, and this interaction may also include that at least some parts referred to as controller activities may be performed by the processor 308, as discussed above.

Figure 4:
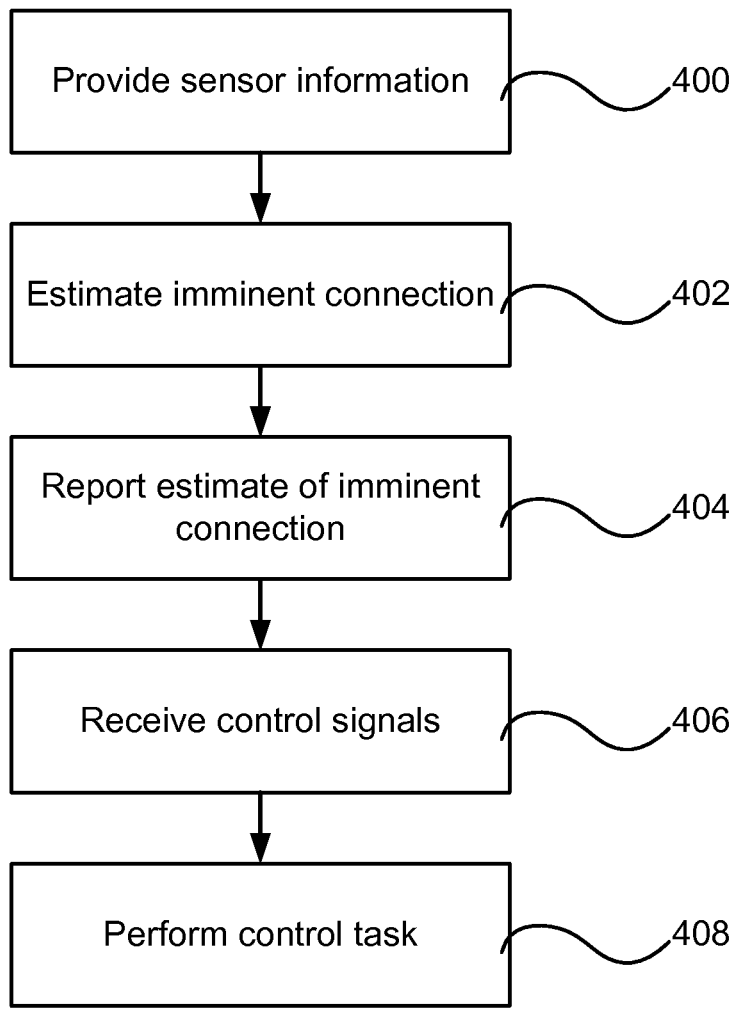
FIG. 4 is a flow chart illustrating a method for a wireless device according to an embodiment.

FIG. 4 is a flow chart illustrating a method for a wireless device according to an embodiment. The wireless device provides 400 sensor information to the server. Thus, the wireless device collects sensor information from sensors that are connected to the wireless device, preferably packages it according to a format agreed with the server, and transmits the sensor information packages as the information appears. Thus, the provision 400 of the sensor information should be considered as a real-time task, as discussed above with reference to the reception of sensor information by the server. The wireless device further estimates 402 imminent connection situation. Here, the estimation 402 may include collection of information, analysis of that information and determining a particular connection state that is expected in close future. Alternatively, the estimation 402 may include collection of as much information as is available locally at the wireless device that is relevant to imminent connection situation and providing that as an information package, wherein the analysis and determination is performed elsewhere, e.g. at a node of the wireless communication system or at the server. The estimate, i.e. whatever information related to this as discussed above, is reported 404 to the server. Control signals are received 406 from the server. Here, as discussed above, the control signals may be of different nature, and the reader is reminded of the explanation above where the control operation may be considered as two real-time objects for easier understanding. The control task is performed 408 accordingly.

Figure 5:
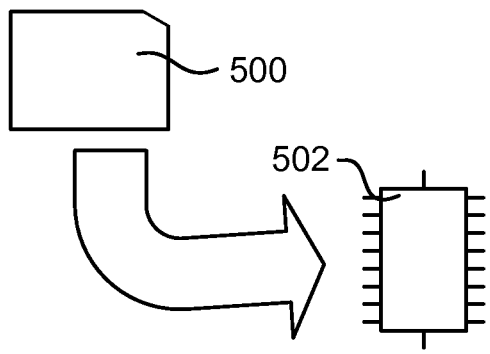
FIG. 5 schematically illustrates a computer-readable medium and a processing device.

The methods according to the present invention are suitable for implementation with aid of processing means, such as computers and/or processors, especially for the case where the processing element 308 demonstrated above comprises a processor handling control operations. For the server 100, it is inherent that there is a processing element controlling the operation of the server 100. Therefore, there is provided computer programs, comprising instructions arranged to cause the processing means, processor, or computer to perform the steps of any of the methods according to any of the embodiments described with reference to FIG. 2 or 4. The computer programs preferably comprises program code which is stored on a computer readable medium 500, as illustrated in FIG. 5, which can be loaded and executed by a processing means, processor, or computer 502 to cause it to perform the methods, respectively, according to embodiments, preferably as any of the embodiments described with reference to FIG. 2 or 4. The computer 502 and computer program product 500 can be arranged to execute the program code sequentially where actions of the any of the methods are performed stepwise. However, as discussed above, the methods may be regarded as real-time objects being performed based on when information is available, and required for that matter. The processing means, processor, or computer 502 is preferably what normally is referred to as an embedded system. Thus, the depicted computer readable medium 500 and computer 502 in FIG. 5 should be construed to be for illustrative purposes only to provide understanding of the principle, and not to be construed as any direct illustration of the elements.

Below, some examples are discussed for the further understanding of the principles demonstrated above.

Figure 7:
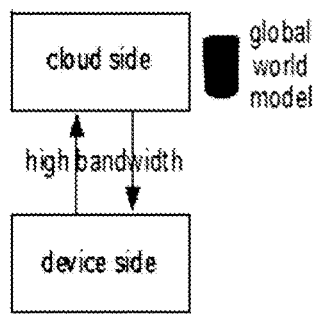
FIG. 7 illustrates applications that operate in several modes depending on the connectivity.
Figure 7:
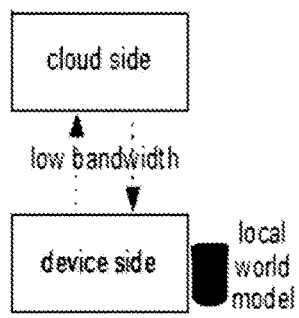

FIG. 7 illustrates applications that operate in several modes depending on the connectivity. In this example we have two modes. In a second application mode, called Reduces Connectivity State, the device side is temporarily disconnected from a cloud side and cannot rely on a world model that is continuously updated. To address the problem of loss of functionality due to low or no bandwidth, the application may be designed to operate in two modes as shown in the example of FIG. 7. In the Connected State, the application consists of two parts that are communicating. Such a setup could for example include a mobile device with a set of sensors and where the sensor data is accumulated and transmitted to a cloud side, i.e. to the server, where it is combined with other data from similar mobile devices to build a model of the physical environment, a world model. The cloud side maintains a world model and transmits the calculated world model back to the mobile device. The world model can be transmitted in entirety or as selected part, the latter for example based on global navigation satellite system (GNSS), e.g. the global positioning system (GPS), information from the device. The world model is the used by the mobile device for navigation and collision avoidance.

Figure 8:
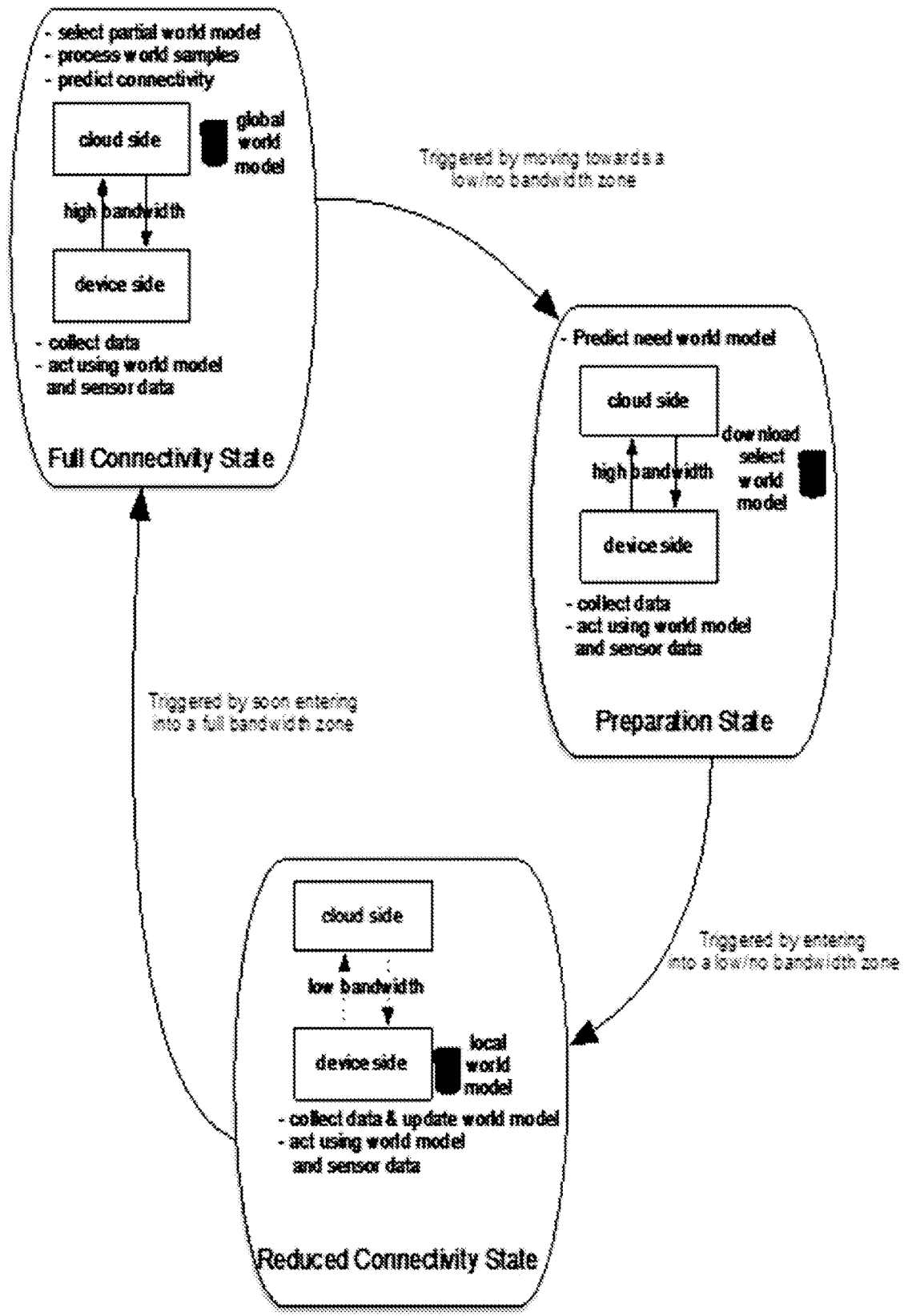
FIG. 8 illustrates that the application enters into a preload state when it determines that it may enter into a geographical areas with reduced connectivity.

FIG. 8 illustrates that the application enters into a preload state when it determines that it may enter into a geographical areas with reduced connectivity. In this state it preloads data from the cloud that it may need during the disconnected phase. The data selection may depend on current location and direction. To improve performance, the device side preloads the parts of the world model that it may need to during the disconnected phase. As illustrated in FIG. 8, the application enters into a third state, Preparation State, when it is notified by the underlying communication system that low or no connectivity is expected shortly. The preparation state may be detected based on radio parameters, like SINR, RSRP, serving cell and neighbouring cell information, measurement order information from the serving cell, RAT used etc.

Figure 9:
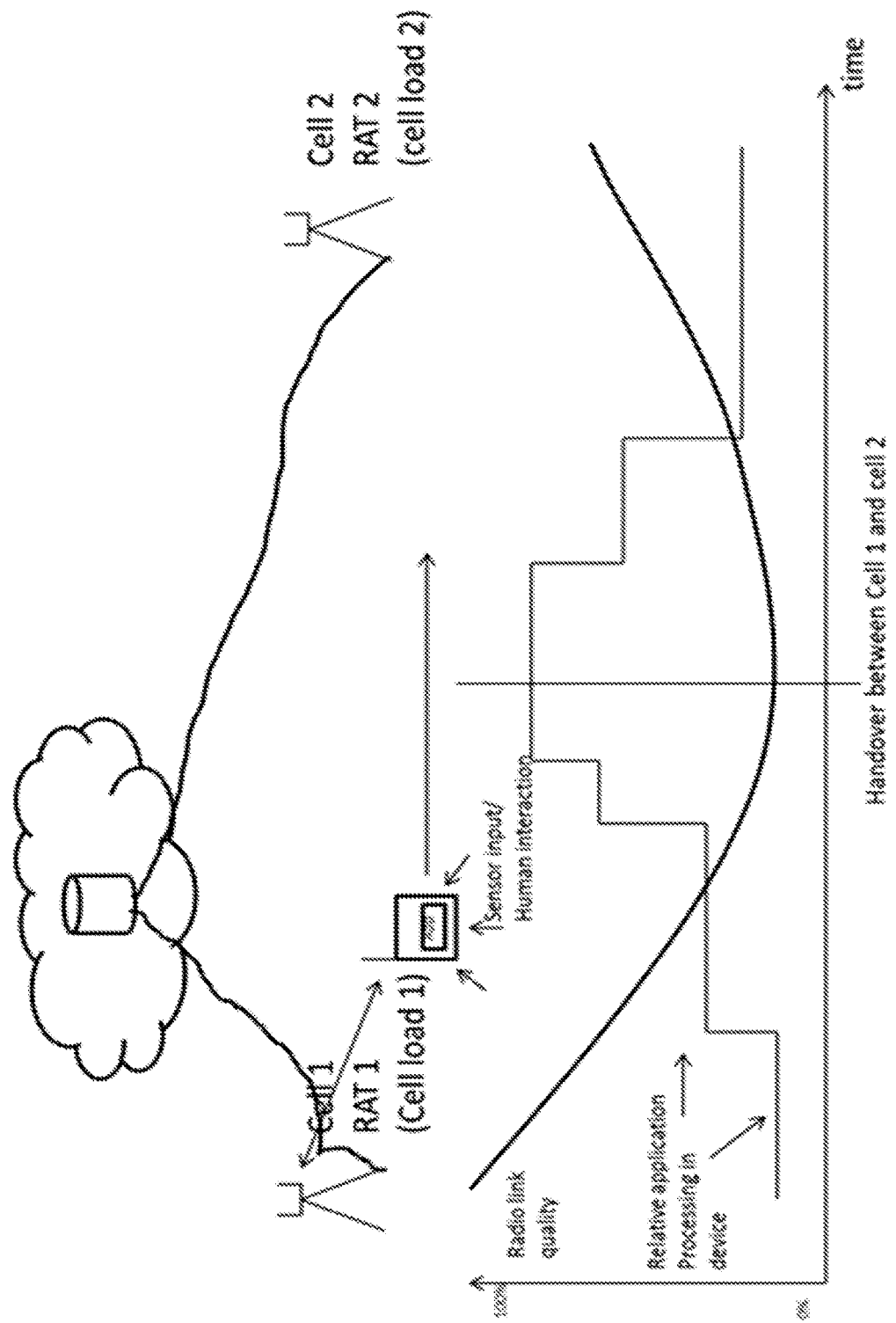
FIG. 9 is a principal sketch showing an example of how the connectivity level may vary over time for a mobile device, and shows a high-level view of how the application split may correlate with the connectivity.

The example application in FIGS. 7 and 8 has two operational modes, but any number of modes is feasible. FIG. 9, which is a principal sketch showing an example of how the connectivity level may vary over time for a mobile device, shows a high-level view of how the application split may correlate with the connectivity. This sketch does not include any transitional modes, such as the Preparation State mentioned in FIG. 8. In FIG. 9, the curved line illustrates the radio link quality and the stair case curve shows the relative share of the application that is executing on the mobile device.

The invention claimed is:

1. A server that is configured to connect to a wireless device via a wireless communication network and that is capable of receiving sensor information from the wireless device and providing control signals based on at least the sensor information to the wireless device for enabling the wireless device to perform a control task, the server comprising:
   one or more processing circuits configured to cause the server to receive an estimate of imminent connection state of the wireless device and adapt operation such that:
   in response to the estimated imminent connection state indicating a connection quality parameter to have a quality below a first threshold, the server provides an information package to be sent to the wireless device for enabling the wireless device to perform at least an increased part of the control task locally at the wireless device which involves the wireless device turning on at least one additional sensor; and
   in response to the estimated imminent connection state indicating the connection quality parameter to have a quality above a second threshold, the server provides an information package to be sent to the wireless device for enabling the wireless device to be relieved from performing at least a part of the control task by the server providing increased aid in performing the control task so as to enable the wireless device to turn off the at least one additional sensor.

2. The server of claim 1, wherein the estimated imminent connection state is based on at least one or more radio channel parameters at the wireless device.

3. The server of claim 2, wherein the radio channel parameters comprise one or more of:
   signal-to-interference-and-noise ratio;
   signal strength;
   uplink throughput;
   downlink throughput;
   latency;
   used radio access technology; and
   one or more of the above for a neighboring cell.

4. The server of claim 1, wherein the estimated imminent connection state is based on at least one or more spatial parameters of the wireless device.

5. The server of claim 4, wherein the spatial parameters comprises one or more of:
   a position of the wireless device; and
   a speed of the wireless device.

6. The server of claim 1, wherein the information package provided from the server for enabling the wireless device to perform at least an increased part of the control task locally comprises one or more of:
a set of computer executable instructions;
a control parameter set; and
a control model.

7. The server of claim 1, wherein the wireless communication network is a cellular network; and wherein the imminent connection state is based on information indicating whether a handover operation is imminent.

8. The server of claim 1, wherein the control signals are further based on at least sensor information from at least a further device being in connection with the server.

9. The server of claim 1, wherein the control task comprises controlling a vehicle.

10. The server of claim 9, wherein the information package comprises information about other vehicles.

11. The server of claim 1, wherein the control signals indicate a full or partial control model or control parameter set, wherein the control task comprises controlling a vehicle based on the full or partial control model or control parameter set, wherein the information package for enabling the wireless device to perform at least an increased part of the control task locally comprises an information package for enabling the wireless device to update the full or partial control model or control parameter set locally at the wireless device, and wherein the information package for enabling the wireless device to be relieved comprises an information package for enabling the wireless device to be relieved from updating the full or partial control model or control parameter set locally at the wireless device by the server providing increased aid in remotely updating the full or partial control model of control parameter set.

12. A method of a server connected via a wireless communication network to a wireless device, the method comprising:
receiving sensor information from the wireless device;
providing control signals based on at least the sensor information to the wireless device for enabling the wireless device to perform a control task;
receiving an estimate of imminent connection state of the wireless device; and adapting operation such that:
in response to the estimated imminent connection state indicating a connection quality parameter to have a quality below a first threshold, providing an information package to be sent to the wireless device for enabling the wireless device to perform at least an increased part of the control task locally at the wireless device which involves the wireless device turning on at least one additional sensor; and
in response to the estimated imminent connection state indicating the connection quality parameter to have a quality above a second threshold, providing an information package to be sent to the wireless device for enabling the wireless device to be relieved from performing at least a part of the control task by the server providing increased aid in performing the control task so as enable the wireless device to turn off the one least one additional sensor.

13. The method of claim 12, wherein the estimated imminent connection state is based on at least one or more radio channel parameters at the wireless device.

14. The method of claim 13, wherein the radio channel parameters comprise one or more of:
signal-to-interference-and-noise ratio;
signal strength;
uplink throughput;
downlink throughput;
latency;
used radio access technology; and
one or more of the above for a neighboring cell.

15. The method of claim 12, wherein the estimated imminent connection state is based on at least one or more spatial parameters of the wireless device.

16. The method of claim 15, wherein the spatial parameters comprises one or more of:
a position of the wireless device; and
a speed of the wireless device.

17. The method of claim 12, wherein the information package provided from the server for enabling the wireless device to perform at least an increased part of the control task locally comprises one or more of:
a set of computer executable instructions; a control parameter set; and a control model.

18. The method of claim 12, wherein the wireless communication network is a cellular network; and wherein the imminent connection state is based on information indicating whether a handover operation is imminent.

19. The method of claim 12, wherein the control signals are further based on at least sensor information from at least a further device being in connection with the server.

20. The method of claim 12, wherein the control task comprises controlling a vehicle.

21. The method of claim 12, wherein the control signals indicate a full or partial control model or control parameter set, wherein the control task comprises controlling a vehicle based on the full or partial control model or control parameter set, wherein the information package for enabling the wireless device to perform at least an increased part of the control task locally comprises an information package for enabling the wireless device to update the full or partial control model or control parameter set locally at the wireless device, and wherein the information package for enabling the wireless device to be relieved comprises an information package for enabling the wireless device to be relieved from updating the full or partial control model or control parameter set locally at the wireless device by the server providing increased aid in remotely updating the full or partial control model of control parameter set.

22. A computer program product stored in a non-transitory computer readable medium for controlling a server connected to a wireless device via a wireless communication network and capable of receiving sensor information from the wireless device and providing control signals based on at least the sensor information to the wireless device for enabling the wireless device to perform a control task, the computer program product comprising software instructions which, when run on a processor of the server, causes the server to:
receive an estimate of imminent connection state of the wireless device and adapt operation such that:
in response to the estimated imminent connection state indicating a connection quality parameter to have a quality below a first threshold, the server provides an information package to be sent to the wireless device for enabling the wireless device to perform at least an increased part of the control task locally at the wireless device which involves the wireless device turning on at least one additional sensor; and
in response to the estimated imminent connection state indicating the connection quality parameter to have a quality above a second threshold, the server provides an information package to be sent to the wireless device for enabling the wireless device to be relieved from performing at least a part of the control task by the server providing increased aid in performing the control task so as to enable the wireless device to turn off the at least one additional sensor.

23. A wireless device comprising:
a control circuit;
at least one sensor configured to collect sensor information;
at least one additional sensor configured to collect additional sensor information;
wherein the control circuit is connected to the sensors;
wherein the control circuit is configured to perform a control task with aid from a server connected to the wireless device via a wireless communication network;
wherein the wireless device is configured to provide the sensor information collected by the at least one sensor to the server and is configured to receive control signals from the server, which control signals are utilized for the control task as the aid for performing the control task;
wherein the wireless device is further configured to estimate an imminent connection state to the wireless communication network and report the estimated imminent connection state to the server such that:
in response to the estimated imminent connection state indicating a connection quality parameter to have a quality below a first threshold, an information package is received from the server for enabling the wireless device to perform at least an increased part of the control task locally at the wireless device which involves the wireless device turning on the at least one additional sensor; and
in response to the estimated imminent connection state indicating the connection quality parameter to have a quality above a second threshold, an information package is received for enabling the wireless device to be relieved from performing at least a part of the control task by the server providing increased aid in performing the control task so as to enable the wireless device to turn off the at least one additional sensor.

24. The wireless device of claim 23, wherein the estimate of imminent connection state is based on a measurement of one or more radio channel parameters.

25. The wireless device of claim 24, wherein the radio channel parameters comprise one or more of:
signal-to-interference-and-noise ratio;
signal strength;
uplink throughput;
downlink throughput;
latency;
used radio access technology; and
one or more of the above for a neighboring cell.

26. The wireless device of claim 23, wherein the estimate of the imminent connection state is based on at least one or more spatial parameters of the wireless device.

27. The wireless device of claim 26, wherein the spatial parameters comprises one or more of:
a position of the wireless device; and
a speed of the wireless device.

28. The wireless device of claim 23, wherein the information package received from the server for enabling the wireless device to perform at least an increased part of the control task locally comprises one or more of:
a set of computer executable instructions; a control parameter set; and a control model.

29. The wireless device of claim 23, wherein the wireless communication network is a cellular network; and wherein the imminent connection state is based on information indicating whether a handover operation is imminent.

30. The wireless device of claim 23, wherein the control task comprises controlling a vehicle.

31. The wireless device of claim 30, wherein the increased aid in performing the control task provided from the server comprises information about other vehicles.

32. The wireless device of claim 23, wherein the control signals indicate a full or partial control model or control parameter set, wherein the control task comprises controlling a vehicle based on the full or partial control model or control parameter set, wherein the information package for enabling the wireless device to perform at least an increased part of the control task locally comprises an information package for enabling the wireless device to update the full or partial control model or control parameter set locally at the wireless device, and wherein the information package for enabling the wireless device to be relieved comprises an information package for enabling the wireless device to be relieved from updating the full or partial control model or control parameter set locally at the wireless device by the server providing increased aid in remotely updating the full or partial control model of control parameter set.

33. A method of controlling a wireless device, the wireless device comprising a control circuit, wherein the control circuit is connected to at least one sensor configured to collect sensor information and to at least one additional sensor configured to collect additional sensor information and the control circuit is configured to perform a control task with aid from a server connected to the wireless device via a wireless communication network, the method comprising
providing the sensor information to the server;
receiving control signals from the server, which control signals are utilized for the control task as the aid for performing the control task;
estimating an imminent connection state to the wireless communication network;
reporting the estimated imminent connection state to the server such that:
in response to the estimated imminent connection state indicating a connection quality parameter to have a quality below a first threshold, an information package is received from the server for enabling the wireless device to perform at least an increased part of the control task locally at the wireless device which involves the wireless device turning on the at least one additional sensor; and
in response to the estimated imminent connection state indicating the connection quality parameter to have a quality above a second threshold, an information package is received for enabling the wireless device to be relieved from performing at least a part of the control task by the server providing increased aid in performing the control task so as to enable the wireless device to turn off the at least one additional sensor; and
controlling one or more physical entities according to the control task.

34. The method of claim 33, wherein the estimating of imminent connection state comprises:
measuring one or more radio channel parameters; and
forming an estimate of the imminent connection state based on at least the one or more radio channel parameters.

35. The method of claim 34, wherein the radio channel parameters comprise one or more of:

signal-to-interference-and-noise ratio;
signal strength;
uplink throughput;
downlink throughput;
latency;
used radio access technology; and
one or more of the above for a neighboring cell.

36. The method of claim 33, wherein the estimating of imminent connection state comprises:
determining one or more spatial parameters of the wireless device; and
forming an estimate of the imminent connection state based on at least the one or more spatial parameters.

37. The method of claim 36, wherein the determining of spatial parameters comprises one or more of:
determining a position of the wireless device; and
determining a speed of the wireless device.

38. The method of claim 33, wherein the information package received from the server for enabling the wireless device to perform at least an increased part of the control task locally comprises one or more of:
a set of computer executable instructions; a control parameter set; and a control model.

39. The method of claim 33, wherein the wireless communication network is a cellular network; and wherein the imminent connection state is based on information indicating whether a handover operation is imminent.

40. The method of claim 33, wherein the control task comprises controlling a vehicle.

41. The method of claim 40, wherein the information package received for enabling the wireless device to be relieved comprises information about other vehicles.

42. A computer program product stored in a non-transitory computer readable medium for controlling a wireless device, the wireless device comprising a control circuit, wherein the control circuit is connected to at least one sensor configured to collect sensor information and to at least one additional sensor configured to collect additional sensor information and the control circuit is configured to perform a control task with aid from a server connected to the wireless device via a wireless communication network, the computer program product comprising software instructions which, when run on a processor of the wireless device, causes the wireless device to:

provide the sensor information collected by the at least one sensor to the server;
receive control signals from the server, which control signals are utilized for the control task as the aid for performing the control task; estimate an imminent connection state to the wireless communication network; report the estimated imminent connection state to the server such that:
in response to the estimated imminent connection state indicating a connection quality parameter to have a quality below a first threshold, an information package is received from the server for enabling the wireless device to perform at least an increased part of the control task locally at the wireless device which involves the wireless device turning on the at least one additional sensor; and
in response to the estimated imminent connection state indicating the connection quality parameter to have a quality above a second threshold, an information package is received for enabling the wireless device to be relieved from performing at least a part of the control task by the server providing increased aid in performing the control task so as to enable the wireless device to turn off the at least one additional sensor; and
control one or more physical entities according to the control task.

43. The method of claim 33, wherein the control signals indicate a full or partial control model or control parameter set, wherein the control task comprises controlling a vehicle based on the full or partial control model or control parameter set, wherein the information package for enabling the wireless device to perform at least an increased part of the control task locally comprises an information package for enabling the wireless device to update the full or partial control model or control parameter set locally at the wireless device, and wherein the information package for enabling the wireless device to be relieved comprises an information package for enabling the wireless device to be relieved from updating the full or partial control model or control parameter set locally at the wireless device by the server providing increased aid in remotely updating the full or partial control model of control parameter set.

* * * * *